United States Patent [19]
Kurata

[11] 4,414,584
[45] Nov. 8, 1983

[54] HIGH-SPEED PLAYBACK FOR VIDEODISCS

[75] Inventor: Hirotaka Kurata, Tokyo, Japan

[73] Assignee: Trio Kabushiki Kaisha, Tokyo, Japan

[21] Appl. No.: 307,878

[22] Filed: Oct. 2, 1981

[30] Foreign Application Priority Data

Oct. 7, 1980 [JP] Japan .................... 55-141774

[51] Int. Cl.³ ............... H04N 5/783; G11B 21/08
[52] U.S. Cl. .................... 358/342; 358/907; 358/312
[58] Field of Search ............... 358/310, 312, 313, 320, 358/321, 335, 338, 342, 907; 360/10.1, 11.1

[56] References Cited
U.S. PATENT DOCUMENTS 4,210,938 7/1980 Heitmann et al. ............. 358/312 X

*Primary Examiner*—Robert L. Richardson
*Attorney, Agent, or Firm*—Gerald J. Ferguson, Jr.; Joseph J. Baker

[57] ABSTRACT

As many as four kinds of high-speed playback of a videodisc can be selected with only two operating switches. This is accomplished by extracting the vertical synchronizing signal from the composite video signal read from the videodisc and, based on this vertical synchronizing signal, producing more than one pulse delayed by a prescribed time. The vertical synchronizing signal and/or the delayed pulses are gated by independently outputted forward or reverse indicator signals for high-speed playback. High-speed playback is executed by forcibly driving the target tracking unit one track at a time in the direction designated by the indicator signal more than twice during the substantial vertical blanking time of the television image corresponding to the gated vertical synchronizing signal and/or the delayed pulses. When the forward and reverse indicator signals are both generated, an even higher speed playback is obtained.

6 Claims, 15 Drawing Figures

FIG. 1
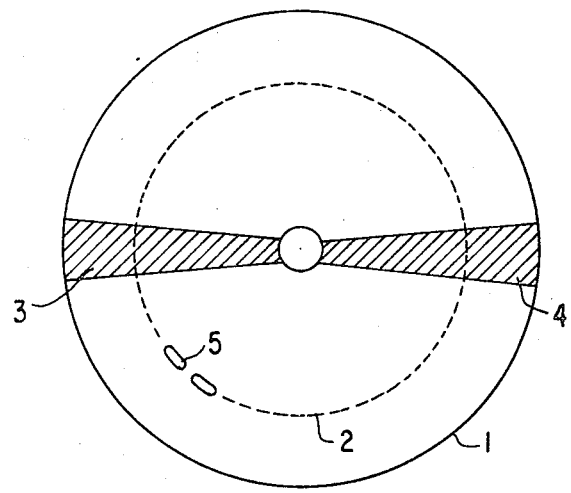
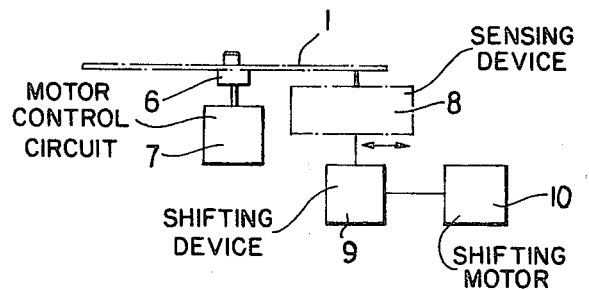
FIG. 2

FIG. 8
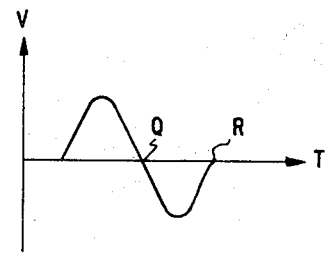
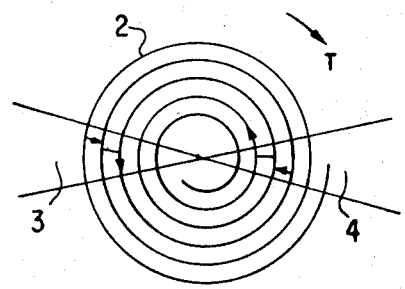
FIG. 9a
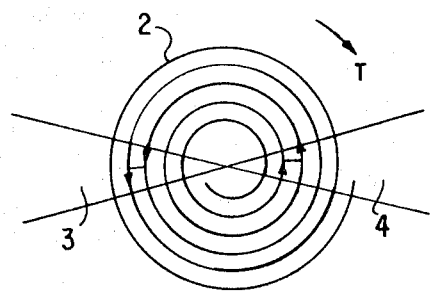
FIG. 9b
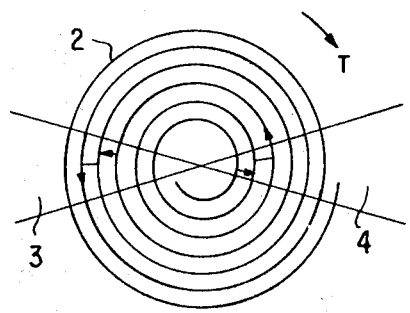
FIG. 9c

HIGH-SPEED PLAYBACK FOR VIDEODISCS

BACKGROUND OF THE INVENTION

This invention relates to a high-speed playback method for videodiscs.

High-speed playback for a videodisc is performed by shifting the position of playback tracks by forced driving of the target tracking unit with a prescribed timing and in a prescribed direction during the vertical blanking time.

This operation was performed previously by installing operating switches for high-speed playback that correspond to forward and reverse playback tracks, respectively. Therefore, as the type of high-speed playback increased, the number of switches for high-speed playback increased, which not only necessitated an operational panel of large area, but had a shortcoming of deteriorating operational characteristics.

SUMMARY OF THE INVENTION

This invention was made in view of the above fact, and the purpose is to produce a high-speed playback method for videodiscs without the above shortcomings and with improved operational characteristics.

The invention accomplishes the foregoing purpose by extracting the vertical synchronizing signal from the composite video signal read from the videodisc and, based on this vertical synchronizing signal, producing more than one pulse delayed by a prescribed time. The vertical synchronizing signal and/or the delayed pulses are gated by independently outputted forward or reverse indicator signals for high-speed playback. High-speed playback is executed by forcibly driving the target tracking unit one track at a time in the direction designated by the indicator signal more than twice during the substantial vertical blanking time of the television image corresponding to the gated vertical synchronizing signal and/or the delayed pulses. When the forward and reverse indicator signals are both generated, an even higher speed playback is obtained.

BRIEF DESCRIPTION OF THE DRAWINGS

FIG. 1 is a diagram presented for the explanation of a videodisc.

FIG. 2 is a schematic block diagram showing the signal read-out unit of the optical videodisc playback system.

FIGS. 7, 8 and 9 are diagrams presented for the explanation of the operations of the first practical example of this invention.

DESCRIPTION OF THE PREFERRED EMBODIMENTS

A videodisc playback system is generally equipped with a means to mount and rotate a videodisc where video signals are recorded on serially positioned identations or pits in a spiral track form; a read-out device for reading video signals; a shifting device that shifts the scanning position of the read-out device in a direction that intersects the above tracks almost at a right angle, that is, in a radial direction of the videodisc; and a control device that controls the above-mentioned shifting device so that the scanning position of the above-mentioned read-out device is on the track.

Videodisc playback systems are available with an optical, a capacitance, or a mechanical playback system. Using an optical videodisc playback system called a triple beam system as an example, the outline of its signal reader unit is briefly explained regarding the part related to this invention.

A videodisc with recorded signals to be reproduced by an optical videodisc playback system is made as shown in FIG. 1. In the videodisc (simply called a disc hereafter) 1, an FM-modulated signal that is multiplexed with a video signal and an audio signal is recorded in a spiral track form as shown by a track 2.

For example, when the disc 1 is rotated at a uniform angular velocity, the video signals are recorded so that $\frac{1}{2}$ revolution of the disc 1 comprises one field, and one revolution makes one frame. The vertical blanking time of the composite video signal, that is, the vertical retrace time is positioned at areas 3 and 4 in FIG. 1. And, signals are recorded in identations positioned serially to form a track 2 as shown in FIG. 1. Normally the width of the track is approximately 1 micrometer, track pitch is approximately 1.7 micrometers, and the pit length, which varies from the outer circumference side to the inner circumference side of the disc 1 ranges from 0.8–6 micrometers resulting in a very high density recording of signals.

Figure 3:
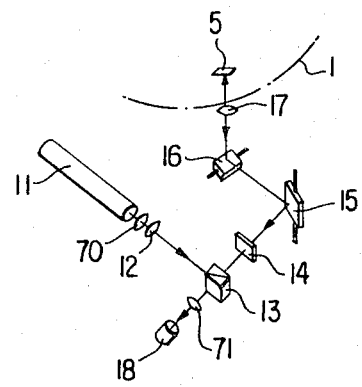
FIG. 3 is a diagram presented for the explanation of the optical unit of the optical videodisc playback system.

On the other hand, the videodisc playback system is equipped with a motor as shown in FIG. 2, for rotating the removable disc 1, which is affixed on a turntable 6, and a control circuit 7 to control the revolutions of the said motor. It is also equipped with an optical system 8 for reading the signals from the recorded signal surface of the disc 1 rotated by the above-mentioned motor. As shown in FIG. 3, the optical system 8 consists of a laser 11 that emits a linearly polarized light flux; a raster grating 70 that forms three light fluxes from the laser 11 light flux; a spot lens 12; a polarizing prism 13 that refracts the light fluxes passing through the spot lens; a $\frac{1}{4}$ wave length plate 14 that converts the refracted light by the prism 13 to a circular polarized light flux; a reflecting mirror 15 for total reflection of the circular polarized light flux from the $\frac{1}{4}$ wave length plate 14 in a direction tangential to the track (called a tangential mirror); a reflecting mirror 16 that reflects the light from the tangential mirror 15 in the radial direction of the disc (called a tracking mirror); and an objective lens 17 which focuses the beam from the laser 11 onto the recorded signal surface of the disc 1. This beam is modulated by pits 5, returns in a reverse path taken above, converted to a linear polarized wave with the ¼ wave length plate 14, passed through the polarizing prism 13 and a cylindrical lens 71, and the reflected beam from the disc 1 is projected onto a photoelectric converter 18 and is read as electric signals.

On the other hand, the optical unit 8 is shifted in the radial direction of the disc 1 by a shifting device 9 that is driven by a shifting motor 10 as shown in FIG. 2. However, in order to read the signals correctly from the recorded signal surface, it is necessary to rotate the disc 1 at a constant angular velocity, and the motor that rotates the disc 1 is controlled by a servo system. In addition, related also to the optical system 8, it is necessary to focus the beam on the recorded signal surface on the disc 1 as mentioned before. Consequently, focus controlling is done from the surface of the disc 1 to control the position of the objective lens 17. Tangential control is also done by controlling the angle of the tangential mirror 15 and driving the light spot on the disc 1 in a direction tangential to track 2 to suppress time-base fluctuation. Furthermore, tracking control is done in which the angle of tracking mirror 16 is controlled so that the light spot always scans over the center of the width of the tracks 2, and the shifting of the optical system 8 is controlled. Of these control systems, the control of revolutions, focus control, and tangential control are not directly related to this invention and are not discussed any further.

Figure 4A:
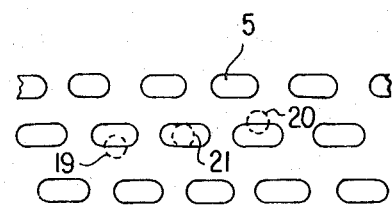
FIGS. 4(a) and 4(b) are diagrams presented for the explanation of the tracking control.

Tracking control is used, as shown in FIG. 4(a), to generate tracking light beams 19 and 20 with the signal-reading light beam 21 (called playback light beam hereafter) in between. The tracking light beams 19 and 20 scan over the disc 1 synchronously with the playback light beam 21 to detect whether or not the playback light beam 21 is correctly scanning over the tracks. In the case of a single light beam mode, tracking is detected by using the diffracted light generated when the light beam strikes the pits.

Figure 4B:
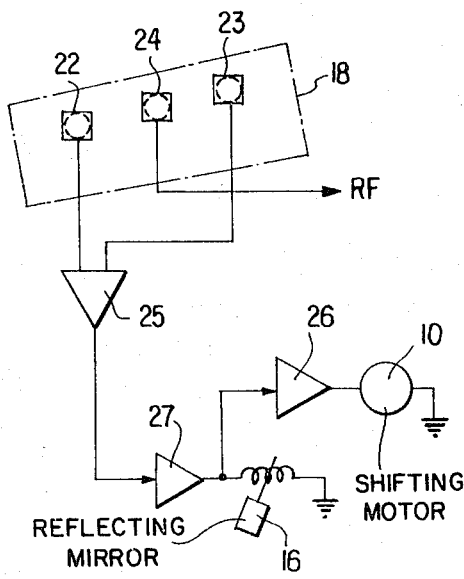

The playback light beam 21 and tracking light beams 19 and 20 are in a set relationship of trigonometric positions: when the playback light beam 21 is in the normal position, the tracking light beams 19 and 20 are not centrally positioned in the track width, but they are set, as shown in FIG. 4(a), so that the tracking light beam 19 that precedes the playback light beam 21 is positioned off to the lower side of pits 5 in FIG. 4(a), the tracking light beam 20 that follows is positioned off to the upper side of pits 5 of FIG. 4(a), and the areas on pits 5 affected by tracking light beams 19 and 20 are equivalent. Consequently, when the playback light beam 21 is positioned off tracks 2, the areas on pits 5 affected by tracking light beams 19 and 20 will be different. In order to have the playback light beam 21 scan the center of tracks 2 by applying the above fact, the reflected beams of tracking light beams 19 and 20 are detected by photoelectric converter elements 22 and 23, respectively, as shown in FIG. 4(b), and the outputs of photoelectric converter elements 22 and 23 are inputted into a differential amplifier 25. The output of the differential amplifier 25 shows a tracking error. The difference output is amplified to provide an indication as to whether or not the playback light beam 21 is correctly scanning. The reflected beam of the playback light beam 21 is received by the photoelectric converter element 24, changed into electrical signals, and derived as a playback RF output.

The output signal of the differential amplifier 25, namely the tracking error signal, turns the tracking mirror 16 through the driver amplifier 27 and concurrently drives shifting motor 10 through the driver amplifier 26 to drive the tracking error signal to zero.

The tracking mirror 16, which is turned by the output of the driver amplifier 27, and the shifting motor 10, which is driven through the driver amplifier 26 by receiving the output of the driver amplifier 27, comprise the target tracking unit, and high-speed forward reproduction is achievable by inputting the signal that forcibly shifts the target tracking unit in essence by more than one track, for example, from the center of the disc 1 toward the outer circumference. High-speed playback is peformed based on this concept. This invention is explained below based on practical examples.

Figure 5:
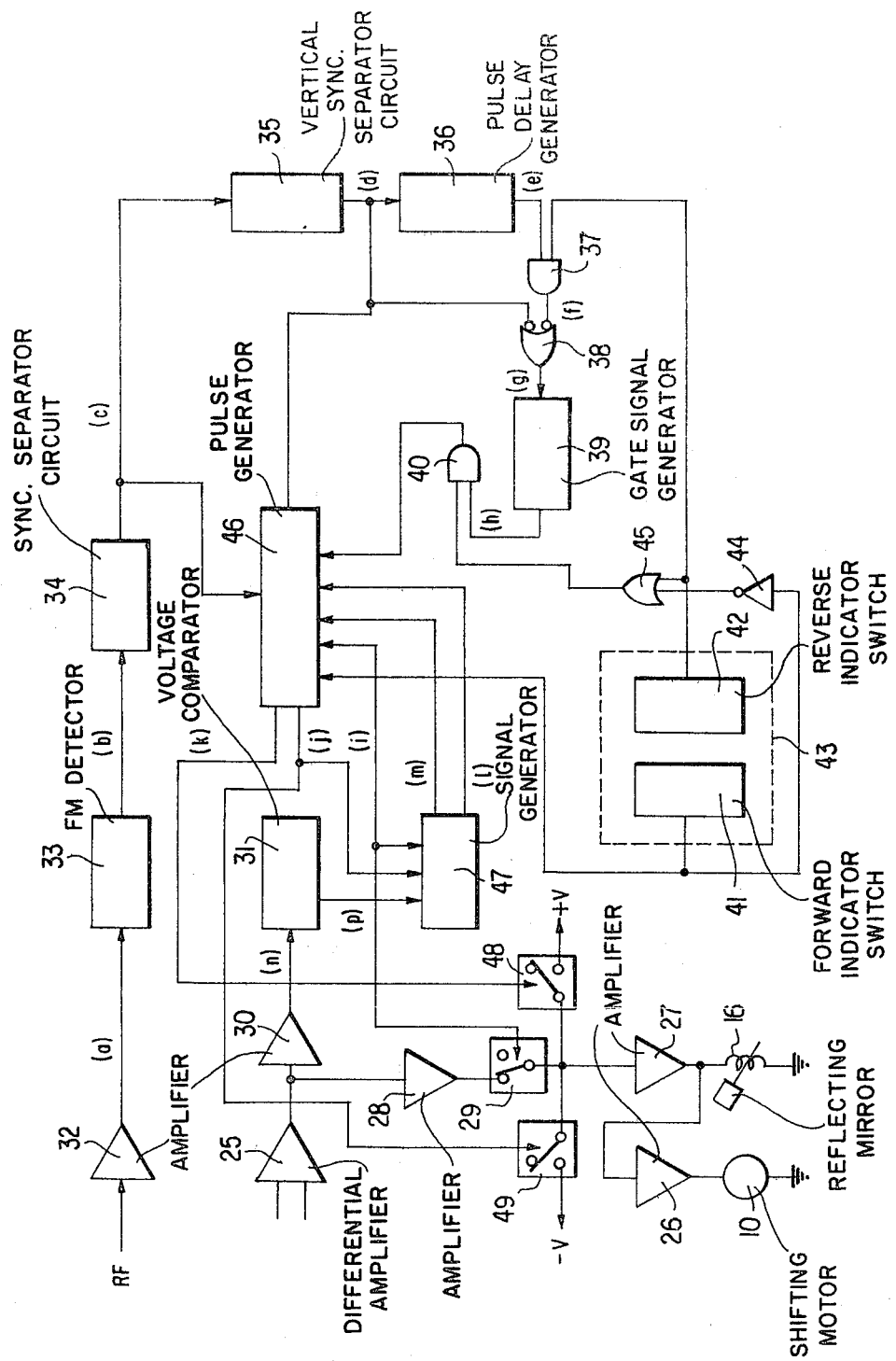
FIG. 5 is a block diagram of the first practical example of this invention.

FIG. 5 is a block diagram of the first practical example of this invention. The output signal of the differential amplifier 25 that outputs tracking error signals is inputted into the controlled tracking unit by way of the transmission characteristics compensation amplifier 28 and a loop switch 29. The output signal of the differential amplifier 25 is impressed on the voltage comparator 31 through the amplifier 30. The standard voltage of the voltage comparator 31 is set to zero volts.

On the other hand, the output signal of the photoelectric converter 24 where the reflected light of the playback light beam 21 enters, is inputted through the amplifier 32 to the FM detector 33 to derive the composite video signal. A sync separator circuit 34 extracts only the synchronizing signals from the outputs of the FM detector 33, and a vertical sync separator circuit 35 extracts vertical synchronizing signals from the synchronizing signals extracted by the sync separator circuit 34. A delay pulse generator 36 generates pulses delayed by a prescribed time, $\tau$, based on the vertical synchronizing signals extracted by the vertical sync separator circuit 35. An AND gate 37 and an OR gate 38 with inverting inputs are connected to provide an input to a gate signal generator 39 that generates an output for forced driving to AND gate 40. A forward indicator switch 41 is provided in the playback mode indicator unit 43, as is a reverse indicator switch 42. During the non-operation time, the forward indicator switch 41 will generate a high-level output, and the reverse indicator switch 42 will generate a low-level output; whereas during operation time, the former will generate a low-level output, and the latter, a high-level output. The outputs of the indicator switches 41 and 42 are supplied by an invertor 44 and an OR gate 45 to enable AND gate 40 when the forward indicator switch 41 or the reverse indicator switch 42 is operated, and when the forward indicator switch 41 and the reverse indicator switch 42 are both operated.

A forced driving pulse generator 46 receives as inputs the output signals of the vertical sync separator circuit 35, the AND gate 40, and the forward indicator switch 41 as well as the zero-crossing signal and loop-closing signal from a loop-closing signal generator 47, respectively. The forced driving pulse generator 46 provides as outputs the loop switch-opening pulse i that opens the loop switch 29 synchronously with the output signals of the AND gate 40. At the same time, pulse generator 46 generates, using the output of the forward indicator switch 41, the second switch change-over pulse output j during forward indication, and the first switch change-over pulse output k during the reverse indication until the above-mentioned zero-crossing signal m as inputted. When the zero-crossing signal m is inputted, pulse generator 46 outputs the first switch change-over pulse k instead of the second switch change-over pulse j, and the second switch change-over pulse j instead of the first switch change-over pulse k until the above-mentioned loop-closing signal is inputted, and resets the loop switch-opening pulse output i.

Figure 6:
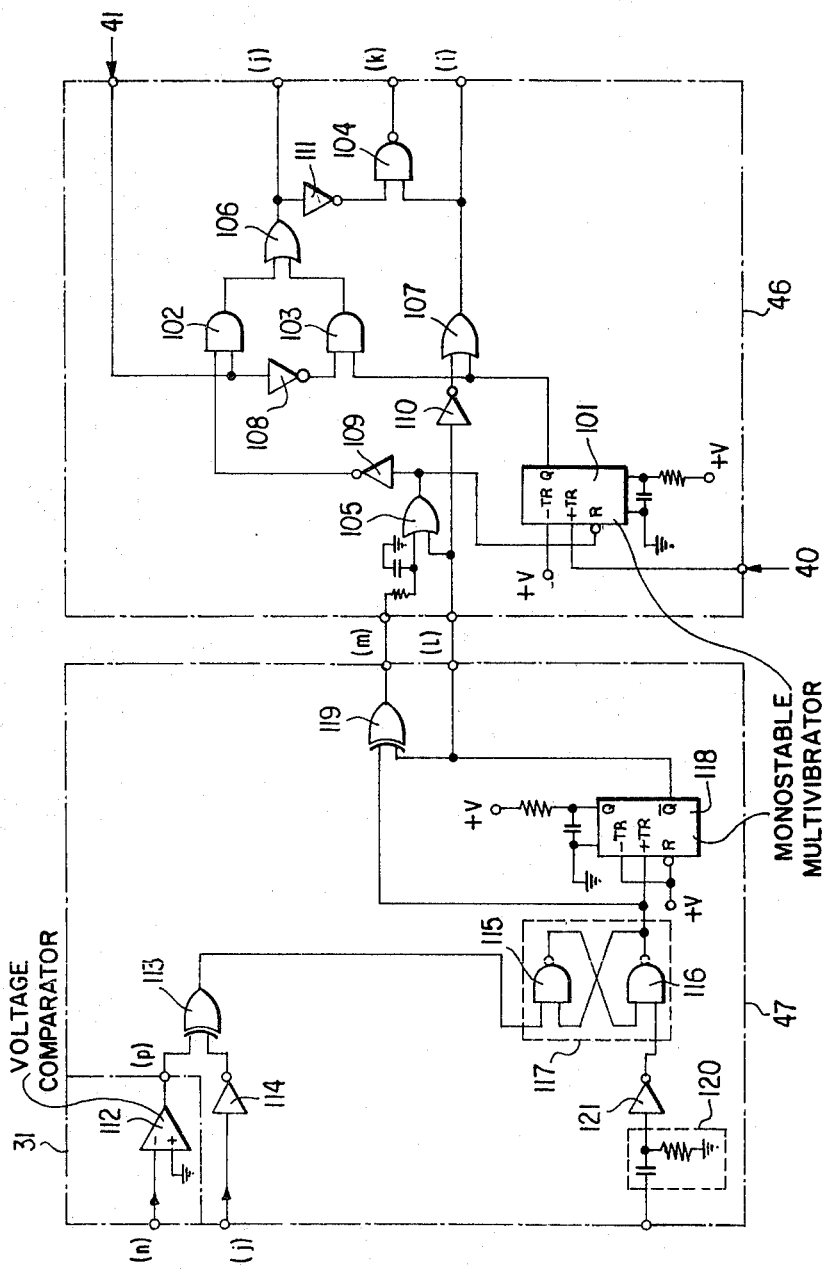
FIG. 6 is a specific block diagram of the voltage comparator, the forced driving pulse generator and the loop-closing signal generator in the first practical example of this invention.

The forced driving pulse generator 46 may be configured, for example as shown in FIG. 6, with a monostable multivibrator 101, AND gates 102 and 103, NAND gate 104, OR gates 105–107, and inverters 108–111.

The loop-closing signal generator 47 uses the pulse output p of the voltage comparator 31, the loop switch-opening pulse output i of the forced driving pulse generator 46, and the second switch change-over pulse output j as inputs, and inputs the zero-crossing signal m and the loop-closing signal l to the forced driving pulse generator 46.

The voltage comparator 31 may be comprised of a voltage comparator amplifier 112 as shown in FIG. 6. The loop-closing signal and zero-crossing signal generator 47 may be configured, as shown in FIG. 6, with an Exclusive OR gate 113, an inverter 114, a flip-flop 117 comprised of NAND gates 115 and 116, a monostable multivibrator 118, an Exclusive OR gate 119, a differentiating circuit 120, and an inverter 121.

The first switch to be switched from the contact position of FIG. 5 by the impression of active low signals is switch 48, and as a result of the switching, it impresses voltage $+V$ to the target tracking unit for the switched duration. In this practical example, the target tracking unit is driven in the reverse direction by the voltage $+V$. The second switch to be switched from the contact position of FIG. 5 by the impression of active high signals is switch 49, and as a result of the switching, it impresses voltage $-V$ to the target tracking unit for the switched duration. The target tracking unit is driven in the forward direction by the voltage $-V$.

Figure 7:
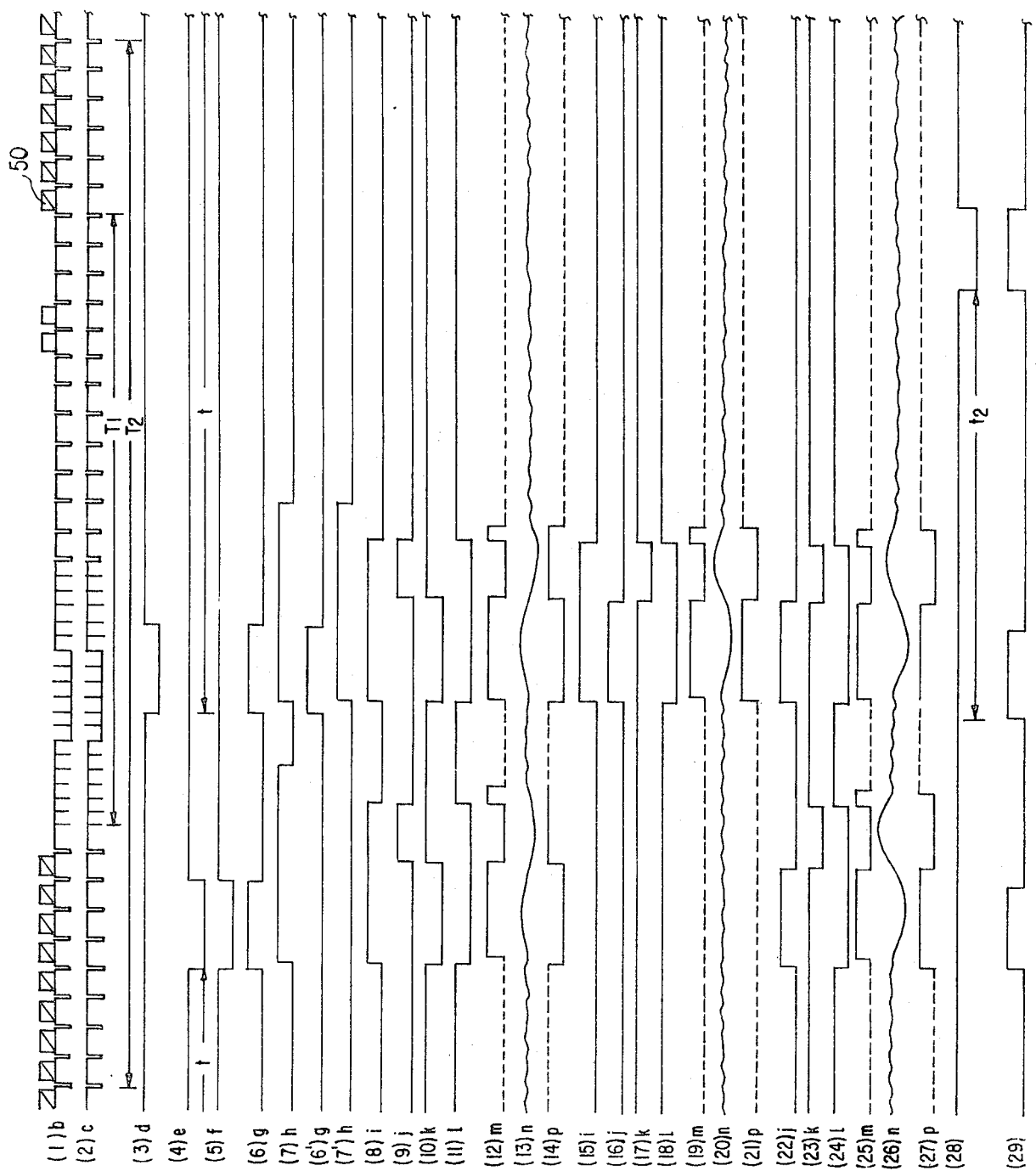

Next, the actions of this practical example are explained using FIGS. 5 and 7.

Signals from the photoelectric converter element 24 are FM waves, and these signals are amplified by the amplifier 32, FM-detected by the FM detector 33, and composite video signal b is outputted at the output terminal of the FM detector 33 as shown in FIG. 7(1). 50 represents a video signal. From the sync separator circuit 34, the synchronizing signal c shown in FIG. 7(2) is outputted. From the vertical sync separator circuit 35, the vertical synchronizing signal d shown in FIG. 7(3) is outputted. And, in FIG. 7, segment $T_1$ shows the vertical blanking time from the synchronizing signals, and segment $T_2$ shows the substantial vertical blanking time of the television receiver picture.

The delayed pulse generator 36 generates a delayed pulse e shown in FIG. 7(4), which is equivalent to the vertical synchronizing signal delayed by the delay time $\tau$ based on the vertical synchronizing signal. This delay time $\tau$ is set such that the delayed pulse e is within the substantial vertical blanking time. As a result of setting the delay time $\tau$ in this manner, no jitter of television images occurs during high-speed playback.

Meanwhile, suppose that the reverse indicator switch 42 is depressed, and the reverse operation is being executed. Here, the forward direction is assumed to be the reproducing direction in which the tracks advance, for example, from the center of the disc 1 toward the outer circumference.

Since reverse is indicated, AND gate 37 is enabled, and the output pulse f of AND gate 37 is the same as the delay pulse e shown in FIG. 7(5). Consequently, the output signal g of OR gate 38 is as shown in FIG. 7(6), and the vertical synchronizing signal d and the delayed pulse e will be outputted from OR gate 38. The gate signal generator 39 is triggered by the output signal g of OR gate 38 and outputs the output pulse h shown in FIG. 7(7) having a slightly longer time width than the time up to the completion of a series of operations for shifting the target tracking unit one track for every output signal of OR gate 38.

Since the reverse indicator switch 42 is now being depressed and reverse operation is being executed, AND gate 40 is enabled, and the output pulse of the gate signal generator 39 shown in FIG. 7(7) is impressed on the forced driving pulse generator 46. At this time, since the forward indicator switch 41 is not depressed, the output from the forward indicator switch 41 to the forced driving pulse generator 46 is at a high level. At the forced driving pulse generator 46, signal i shown in FIG. 7(8), which turns the loop switch 29 to an off-state, is outputted synchronously with the rise of the output pulse of the gate signal generator 39, and at the same time, signal k shown in FIG. 7(10) which switches the first switch 48 is also outputted. The tracking loop is opened, and concurrently the voltage $+V$ is impressed on the target tracking unit, and the target tracking unit is forcibly shifted to the adjacent track side in the reverse direction. As a result of this shifting, the tracking light beams 19 and 20 move in the reverse direction, and the tracking error signal of the differential amplifier 25 which was amplified by the amplifier 30 increases as shown in FIG. 8. The position of the output shown by point Q in FIG. 8 corresponds to the time when the playback light beam 21 reaches a position exactly half way to the adjacent track in the reverse direction. The position of the output shown by point R corresponds to the time when the playback light beam 21 is positioned on the adjacent track in the reverse direction. FIG. 7(13) shows a waveform of the tracking error signal which was amplified by the amplifier 30. This tracking error signal is compared with the zero voltage at the voltage comparator 31, and the voltage comparator 31 generates an output p as shown in FIG. 7(14). In this case, due to the state in which the signal i is outputted and signal j is not outputted, the loop-closing signal generator 47 outputs the zero-crossing signal m shown in FIG. 7(12), and at the position corresponding to the point Q in FIG. 8, the forced driving pulse generator 46 resets the signal k and outputs signal j. Consequently, the first switch 48 is switched and the impression of the voltage $+V$ onto the target tracking unit stops; and the second switch 49 is switched and the voltage $-V$ is impressed on the target tracking unit. Now, the voltage impressed through the second switch 49 is in reverse polarity to the voltage impressed through the first switch 48. Thus, when voltage $-V$ is impressed by the signal j, the target tracking unit will be driven in the forward direction. FIG. 7(9) shows the signal which is impressed on the target tracking unit by the signal j. Here, the input for driving in the forward direction shown in FIG. 7(9) is provided to stop the target tracking unit in order to prevent shifting of the target tracking unit past the adjacent track in the reverse direction by inertia.

As the result of these actions, the target tracking unit shifts to the point R shown in FIG. 8, namely the immediately neighboring track in the reverse direction, and the completion of this shifting is detected by the voltage comparator 31. Then, the loop-closing signal generator 47 resets the loop-closing signal l which has been at a low level since the loop switch 29 was switched off as shown in FIG. 7(11). As a result of this resetting, the forced driving pulse generator 46 resets the signal j, then resets the signal i. Therefore, the second switch 49 returns to the original position, the impression of the voltage −V on the target tracking unit is removed, the loop switch 29 is switched on and the tracking loop is operational once again, thus returning to the state of being controlled by the tracking error voltage.

The above-mentioned operation is performed for every output pulse from the AND gate 40, that is for each vertical synchronizing signal d and delay pulse e. Thus, it is performed twice in one field. And, it is the same in the next field. Consequently, in the case of reverse indication, shifting of tracks occurs twice in each field. Thus, when one frame of signals are recorded in one track, three times faster playback will be accomplished in reverse.

Next, explanation is made regarding the case when the forward indicator switch 41 is depressed and forward operation is being executed. In this case, the reverse indicator switch 42 is not depressed. Consequently, AND gate 37 is not enabled, and AND gate 40 is enabled. Therefore, the output signal g of OR gate 38 is generated by the vertical synchronizing signal d alone, as shown in FIG. 7(6'). The gate signal generator 39 is triggered by this signal g and generates output signal h shown in FIG. 7(7'). This output signal h is impressed on the forced driving pulse generator 46. In this case, since the forward operation is being executed, the signals outputted from the forward indicator switch 41 to the forced driving pulse generator 46 are at a low level. Thus, the forced driving pulse generator 46 outputs signals i and j synchronously with the input signals from AND gate 40. The loop switch 29 is switched, and at the same time, the second switch 49 is switched. Voltage −V is impressed on the target tracking unit, and the target tracking unit is forcibly driven to the adjacent track in the forward direction contrary to the reverse case discussed above. Signal i in this case is shown in FIG. 7(15), and signal j is shown in FIG. 7(16), and due to the switching of the second switch 49, voltage −V is impressed on the target tracking unit. Because of the impression of this voltage −V, the target tracking unit shifts to the forward side, the output of the amplifier 30 results in such an output waveform as obtained by inverting the waveform shown in FIG. 8 with respect to the abscissa, and the polarity is reversed from the previous case of reverse operation. Point Q and point R correspond, respectively, to the positions to which the respective playback beams 21 shifted, up to the mid-point toward the adjacent track and to the next adjacent track. FIG. 7(20) shows the output voltage waveform of the amplifier 30. The shifting to positions corresponding to points Q and R in FIG. 8 is detected by the voltage comparator 31. FIG. 7(21) shows the output pulse of the voltage comparator 31. When it reaches the above-mentioned point Q, the signal j is reset as shown in FIG. 7(16), the signal k is reset as shown in FIG. 7(17), and the second switch 49 is switched off and the first switch 48 is switched on. Consequently, voltage +V is impressed on the target tracking unit through the first switch 48, and the target tracking unit is driven in the reverse direction to cancel the inertia of the target tracking unit to control the excess shifting by the voltage +V when the playback light beam 21 is in the intermediate position toward the adjacent track in the forward direction. Signals for forward indication, l and m are shown in FIG. 7(18) and (19).

In the case of the forward operation, as mentioned before, the loop switch 29 and the first switch 48 return to the original state after the target tracking unit is shifted one track in the forward direction, and the target tracking unit is controlled by the tracking error voltage. The shifting of one track occurs once during the substantial vertical blanking time of each field in the forward indication time. Therefore, when the signal in one frame is recorded in one track, three times fast forward playback is achieved as shown in FIG. 9(b). In the case of forward shifting, three times faster shifting is made by shifting of one track per field once. This is due to the fact that the disc 1 is rotating even during the forced driving operation, and one track forward shifting occurs in one revolution of the disc.

Next, an explanation is made regarding the case when both the forward indicator switch 41 and the reverse indicator switch 42 are depressed.

In this case, both AND gates 37 and 40 are enabled. Thus, the output pulse f of AND gate 37 and the output pulse g of OR gate 38 are the same respectively with FIG. 7(6) and (7). The output pulse from the AND gate 40 to the forced driving pulse generator 46 is the same as in the case of the previously described reverse operation, and the output from the forward indicator switch 41 to the forced driving pulse generator 46 is the same as in the case of the previously described forward operation. Forward shifting occurs for each field, and the actions in the case of forward shifting are generated twice. Signal i is the same as that in FIG. 7(8); signal j is shown in FIG. 7(22); signal k, in FIG. 7(23); loop-closing signal l, in FIG. 7(24); zero-crossing signal m, in FIG. 7(25); the waveform of the output n from the amplifier 30, in FIG. 7(26); and the output pulse p of the voltage comparator 31, in FIG. 7(27).

Consequently, the target tracking unit is shifted on tracks in the forward direction twice per track per field as shown in FIG. 9(c) during the substantial blanking time, and when the signal of one frame is recorded in one track, five times faster forward playback is accomplished. In FIG. 9, the arrow T indicates the rotational direction of the disc 1.

Next, an explanation is made on the second practical example of this invention.

Figure 10:
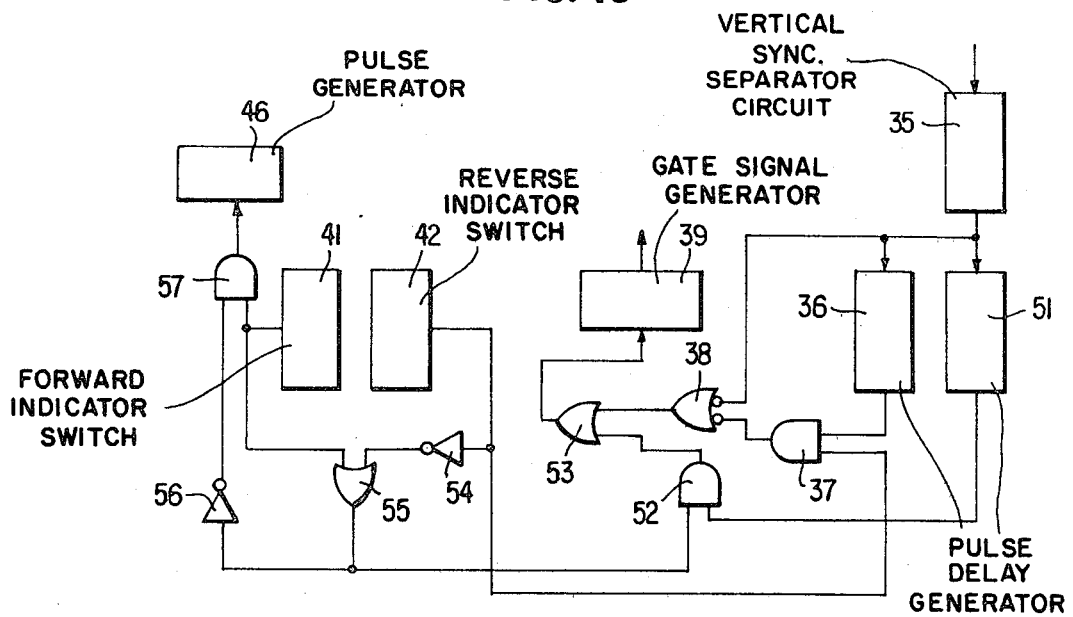
FIG. 10 is a block diagram showing a part of the second practical example of this invention.

FIG. 10 is a partial block diagram of the second practical example of this invention, which is a modification of a part of the first practical example of this invention shown in FIG. 5. This practical example is configured by adding a delay pulse generator 51, AND gates 52 and 47, OR gate 53 and NOR gate 55, and inverters 54 and 56 as shown in FIG. 10, to the first practical example of this invention shown in FIG. 5.

The delay pulse generator 51 is a device that generates pulses delayed by a prescribed time $\tau$ based on the vertical synchronizing signal d. This delay pulse generator 51 generates pulse $e_2$ shown in FIG. 7(28). This pulse is gated by AND gate 52.

In the case of the previously described first example, when the forward indicator switch 41 and the reverse indicator switch 42 are individually operated, the output of the NOR gate 55 becomes a low level output, and when they are operated simultaneously, a high-level output results.

Figures 11, 14:
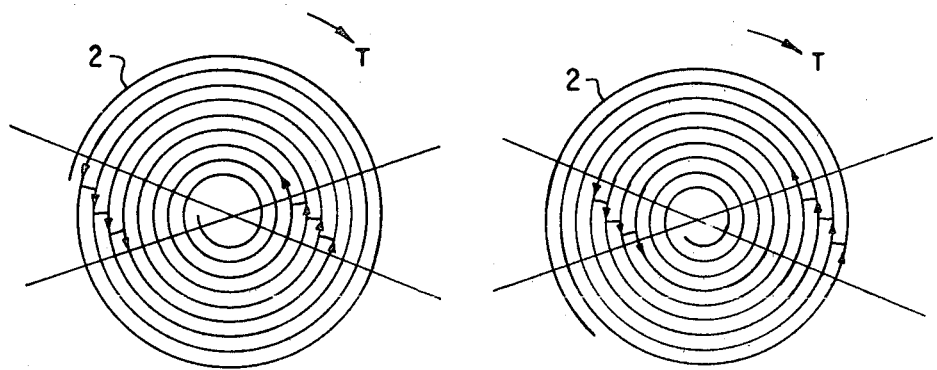
FIG. 11 is a diagram presented for the explanation of the operations of the second practical example of this invention.

Therefore, when the forward and reverse indicator switches 41 and 42 are simultaneously operated, AND gate 52 is enabled, and at its output terminal appears the output pulse e₂ of the delay pulse generator 51. In this state, the output pulse shown in FIG. 7(28) will appear from OR gate 53, and both outputs of FIGS. 7(6) and (28) will be inputted to the gate signal generator 39. This signal is shown in FIG. 7(29). Consequently, the gate signal generator 39 outputs as many extra signals as pulses are generated by the delay pulse generator 51, and it drives the forced driving pulse generator 46 through AND gate 40. Therefore, the target tracking unit shifts three times in the reverse direction for every field during the substantial vertical blanking time; and as shown in FIG. 11, when the signal in one frame is recorded in one track, five times faster reverse playback is achieved. When the forward or the reverse operating switch is individually operated, the output pulse of the delay pulse generator 51 is cut off by AND gate 52, and exactly the same action as in the case of the first example of this invention occurs.

As explained above, and as is clear from the first and second practical examples, when the forward and reverse indicator switches for high-speed playback 41 and 42 are installed in addition to the forward playback and reverse playback operating switches and are operated individually, three times faster playback is possible, and when the forward and reverse indicator switches for high-speed playback are simultaneously operated five times faster forward playback is possible in the case of the first practical example, and five times faster reverse playback, in the case of the second practical example.

In the first and the second practical examples, the five times faster forward playback and the five times faster reverse playback cases are separately explained. However, five times faster forward and reverse playback can also be accomplished with a pair of operating switches for high-speed playback by determining the five times faster forward playback indication or the five times faster reverse playback indication as to whether the forward indication was operated first or the reverse indication was operated first at the time of simultaneous operation of the indicator switches 41 and 42 for high-speed playback. This case of a practical example is explained next as the third practical example of this invention.

Figure 12:
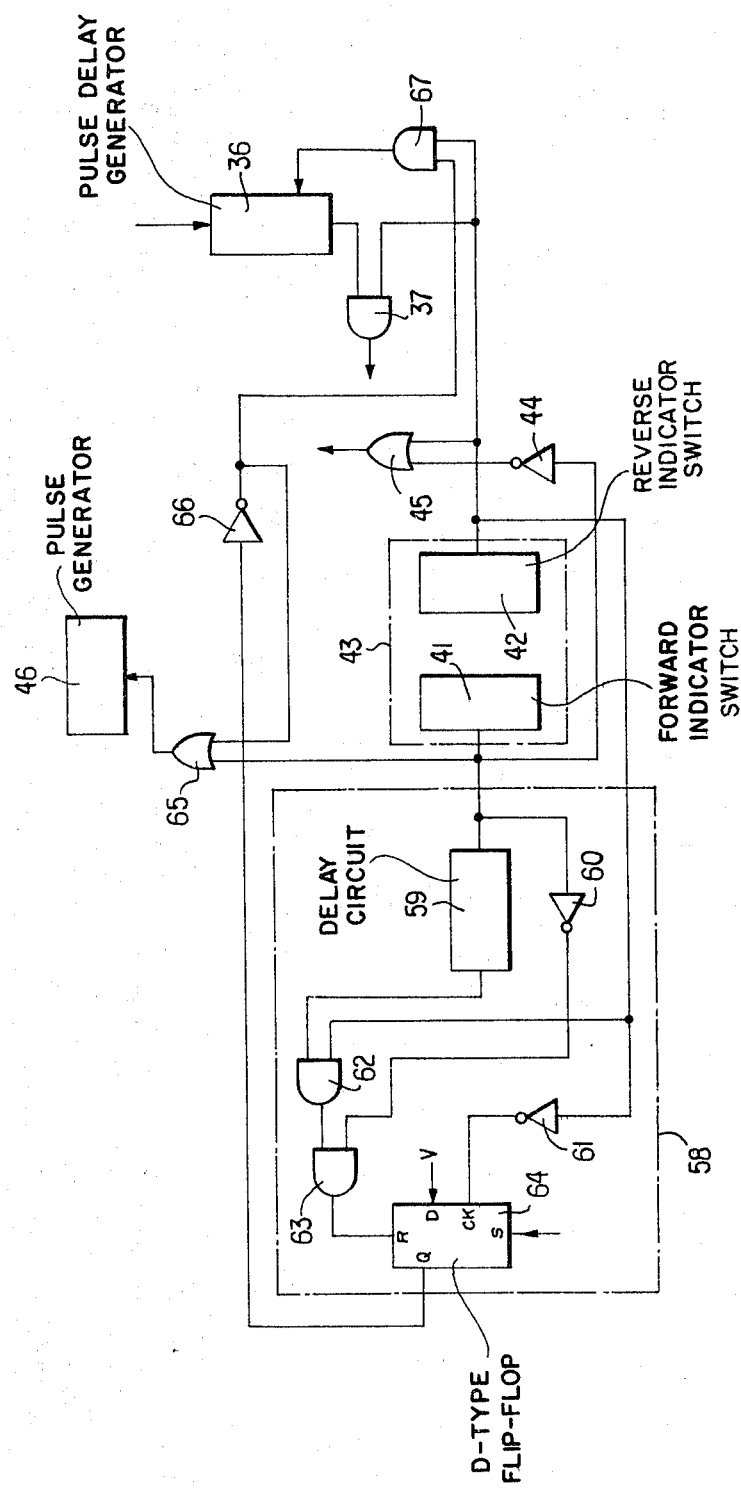
FIG. 12 is a block diagram showing a part of the third practical example of this invention.

FIG. 12 is a partial block diagram of the third practical example of this invention, and it is a modification of a part of the first practical example of this invention shown in FIG. 5. In this practical example, a sequence determining circuit 58 that determines the operational sequence of forward playback indication/reverse playback indication, OR gate 65, AND gate 67, and inverter 66 are added, as shown in FIG. 12, to the first practical example of this invention shown in FIG. 5. The sequence determining circuit 58 is comprised of a delay circuit 59, AND gates 62 and 63, inverters 60 and 61, and D-type flip-flop 64. The D-type flip-flop 64 is set at the power supply switch-on time. The delay pulse generator 36 is configured to output the pulse shown by a heavy line in FIG. 13(e) when the output signal of AND gate 67 reaches a high level.

The output during the operation time and non-operation time of the forward indicator switch 41 and reverse indicator switch 42 are identical to the cases of the first and the second practical examples of this invention. The sequence determining circuit 58 generates a high-level output in advance by, for example, switching on the power supply.

Figure 13:
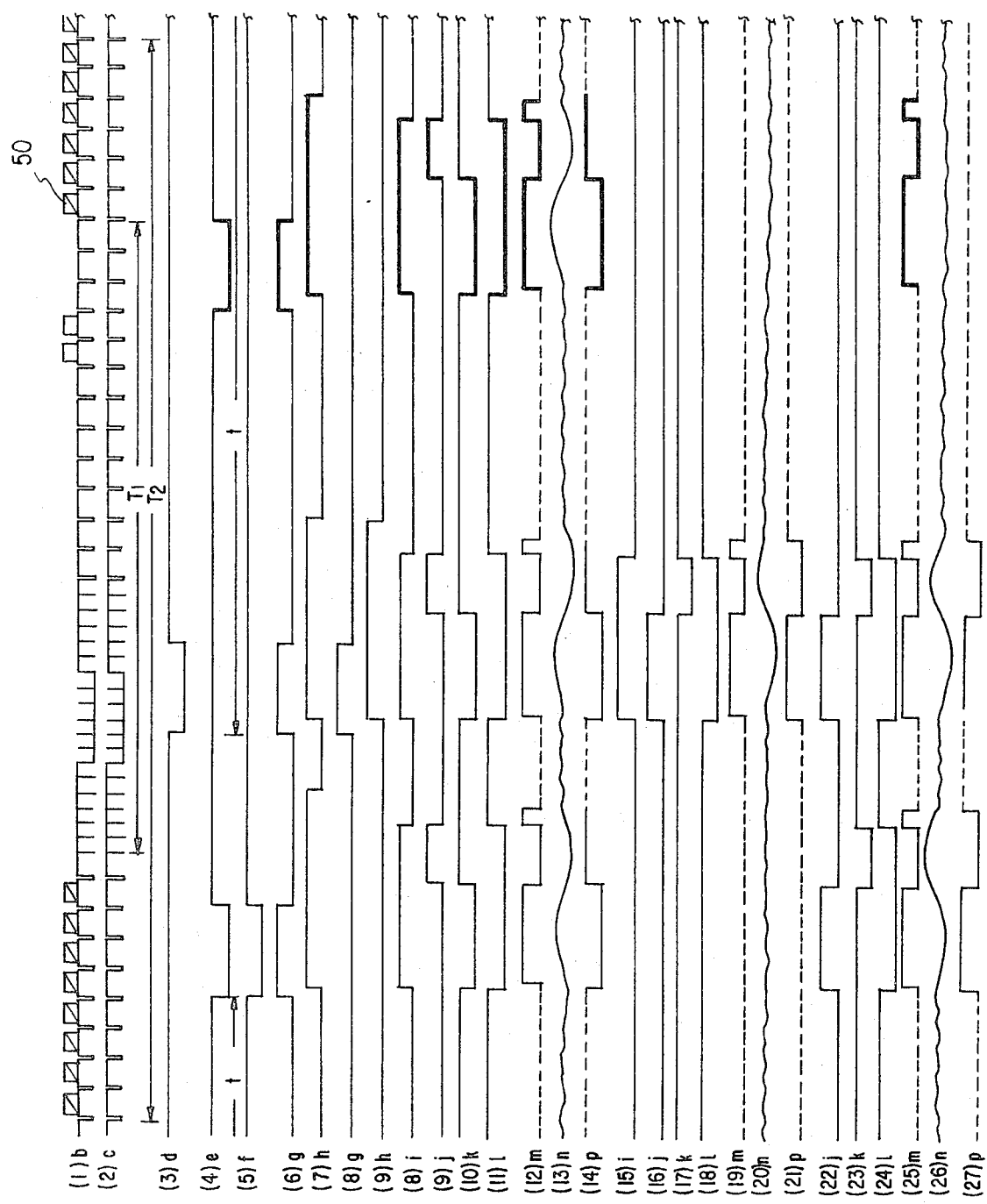
FIGS. 13 ad 14 are diagrams presented for the explanation of the operations of the third practical example of this invention.

Now, when only the reverse indicator switch is depressed, AND gate 37 is enabled, the output of the inverter 66 is at a low level, AND gate 67 is not enabled, AND gate 40 is enabled, and OR gate 65 generates a high level output. This is the same as the case of reverse operation in FIG. 5. This segment shown by a heavy line in FIG. 13 is unrelated, and the output signals i, j, and k of the forced driving pulse generator 46 result as shown in FIGS. 13(8), (9), and (10) excluding the heavy line segments. Consequently, a three times faster reverse playback is accomplished. The signals g, h, l, m, n, and p, in this case, are unrelated to the segments shown by heavy lines and are as shown in FIGS. 13(6), (7), (11), (12), (13), and (14), respectively.

Next, when only the forward indicator switch 41 was depressed, AND gate 37 is not enabled, the output of the inverter 66 is at a low level, AND gate 67 is not enabled, AND gate 40 is enabled, and since the output of the forward indicator switch 41 is at a low level, the output of OR gate 65 results in a low-level output, which is the same as in the case of the forward operation in FIG. 5. The output signals i, j, and k of the forced driving pulse generator 46 are as shown in FIGS. 13 (15), (16), and (17). Thus, a three times faster forward playback is executed.

Next, when the reverse indicator switch 42 is depressed after the forward indicator switch 41 is depressed, the output of the sequence determining circuit 58 is maintained at a high level. Thus, the output of the inverter 66 is maintained at a low level, and AND gate 67 remains not enabled. AND gate 37 is enabled as is AND gate 40, and since the forward indicator switch 41 has a low level output, OR gate 65 generates a low level output. This is the same as in the case of FIG. 5 when the forward indicator switch 41 and the reverse indicator switch 42 are depressed, the segments shown by heavy lines in FIG. 13 are unrelated, and the output signals i, j, and k of the forced driving pulse generator 46 excluding the heavy line segments are as shown in FIG. 13(8), (22), and (23). Consequently, a five times faster forward playback is executed. And, the signals l, m, n, and p in this case result as shown in FIG. 13(24), (25), (26), and (27), respectively.

Next, when the forward indicator switch 41 is depressed after the reverse indicator switch 42 has been depressed, the D-type flip-flop 64 of the sequence determining circuit 58 is reset and changed to a low level output as a result of the output of AND gate 63 reaching a high level. Consequently, the output of the sequence determining circuit 58 becomes a low level output, and the output of the inverter 66 becomes a high level output. As a consequence, AND gate 67 is enabled, and since the reverse indicator switch 42 is generating a high level output, AND gate 67 generates a high level output and the delay pulse generator 36 also generates an output shown by the heavy line in FIG. 13(4). On the other hand, AND gates 37 and 40 are both enabled, and OR gate 65 has a high level output. Thus, the output signals i, j, and k of the forced driving pulse generator 46 are as shown in FIG. 13(8), (9), and (10) including the heavy line segments, and they will drive the target tracking unit in the reverse direction three times for every field. The target tracking unit shifts as shown in FIG. 14, and a five times faster reverse playback will be executed. In this case, the signals g, h, l, m, n, and p are as shown in FIG. 13(6), (7), (11), (12), (13), and (14) including heavy line segments.

As explained above, when this invention is used, four kinds of high-speed playback can be selected with two operating switches for high-speed playback, and the operational characteristics at the time of high-speed playback selection is very much improved. Furthermore, when the two operating switches for high-speed playback are positioned next to each other, operation can be very simply performed. In addition, it is not necessary to use four operating switches for the four kinds of high-speed playback, and the area of the operating panel surface can be minimized.

What is claimed is:

1. In a videodisc playback system of the type having means to mount and rotate a videodisc on which are recorded composite video signals in a spiral track, sensing means for reading the video signals from the spiral track, shifting means for shifting the position of said sensing means along a radial of the video disc, and control means for controlling said shifting means so that (a) the position of the sensing means is maintained on the track or (b) the sensing means is shifted from one track to another, the improvement consisting of a high speed playback circuit comprising:

sync separating means responsive to the output of said sensing means for extracting vertical synchronizing signals from the composite video signals read from the videodisc, delay pulse generator means responsive to the output of said sync separating means for producing at least one delay pulse for each vertical synchronizing pulse, where the delay pulses are delayed by a prescribed time from said vertical synchronizing signals such that the delay pulses and the vertical synchronizing pulse fall within a fixed time period greater than the horizontal blanking interval of the composite video signals, a single forward indicator switch and a single reverse indicator switch producing, respectively, forward and reverse indicator signals where the forward indicator signal indicates movement along said radial in one direction and the reverse indicator signal indicates movement along said radial in the direction opposite said one direction, said control means including means responsive to said vertical synchronizing signals, said delay pulses, and said forward and reverse indicator signals for controlling said shifting means to shift said sensing means along said radial to effect fast playback in the direction selected by the operator controlled indicator switch, the number of tracks the sensing head is shifted each field of the composite video signal depending on whether one or both of said forward and reverse indicator switches are operated where the fastest playback occurs in response to both indicator switches being operated.

2. The improved high speed playback circuit as recited in claim 1 wherein said control means includes tracking means for producing an error signal corresponding to a tracking error, said shifting means being responsive to said error signal, said control means further comprising:

first switch means connected between said tracking means and said shifting means for supplying said error signal to said shifting means when said first switch means is in a closed position, second switch means connected between a first polarity voltage source and said shifting means for supplying a first polarity voltage to said shifting means when said second switch means is in a closed position, third switch means connected between a second polarity voltage source and said shifting means for supplying a second polarity voltage to said shifting means when said third switch means is in a closed position, said first switch means being opened and said second switch means being closed to drive said sensing means one track in the forward direction for each vertical synchronizing signal or delay pulse, and said first switch means being opened and said third switch means being closed to drive said sensing means one track in the reverse direction for each vertical synchronizing signal or delay pulse.

3. The improved high speed playback circuit as recited in claim 2 wherein said control means further comprises:

voltage comparator means responsive to said error signal for generating a zero-crossing output signal, loop closing generator means responsive to said zero-crossing output signal and signals controlling said first and third switch means for generating a zero-crossing control signal and a loop-crossing control signal, and first pulse generator means responsive to said vertical synchronizing signals and delay signals, and said zero-crossing and loop-closing control signals for generating switch control signals to control said first, second and third switch means, said switch control signals opening said second or third switch means and briefly closing said third or second switch means, respectively, after said sensing means has been shifted by one track as detected by said voltage comparator means and thereafter opening both said second and third switch means and closing said first switch means.

4. The improved high speed playback circuit as recited in claim 3 wherein said control means includes gating means comprising:

first AND gate means enabled by said reverse indicator signal for gating the output of said delay pulse generator means, first OR gate means for passing the output of said first AND gate means or said vertical synchronizing signal from said sync separating means, gate signal generator means responsive to the output of said first OR gate means for generating a driving output pulse, second OR gate means for passing said reverse indicator signal or the inverse of said forward indicator signal, and second AND gate means enabled by the output of said second OR gate means for gating the output of said gate signal generator means to said first generator means, said first pulse generator means also receiving said forward indicator signal.

5. The improved high speed playback circuit as recited in claim 4 wherein said gating means further comprises:

second delay pulse generator means responsive to the output of said sync separating means for producing second delay pulses delayed by a second prescribed time from said vertical synchronizing signal, third AND gate means for gating said second delay pulses, third OR gate means for passing the output of said first OR gate means or the output of said third AND gate means to said gate signal generator means, NOR gate means responsive to said forward indicator signal and the inverse of said reverse indicator signal for generating an enabling signal for said third AND gate means, and fourth AND gate means for logically combining said forward indicator signal and the inverse of the output of said NOR gate means and supplying the resulting output to said first driving pulse generator means.

6. The improved high speed playback circuit as recited in claim 4 wherein said gating means further comprises:

sequence determining means responsive to said forward and reverse indicator signals for generating an output indicative of the sequence in which said forward and reverse indicator signals are generated, fifth AND gate means enabled by said reverse indicator signal for gating the output of said sequence determining means to said delay pulse generator means, said delay pulse generator means being responsive to the output of said fifth AND gate means for generating an additional delay pulse, and fourth OR gate means for passing the output of said sequence determining means or said forward indicator signal to said first driving pulse generator means.

* * * * *